(12) United States Patent
Kono et al.

(10) Patent No.: US 11,671,874 B2
(45) Date of Patent: Jun. 6, 2023

(54) COMMUNICATION BAND CALCULATION DEVICE, COMMUNICATION BAND CALCULATION METHOD, AND MEDIUM

(71) Applicant: NIPPON TELEGRAPH AND TELEPHONE CORPORATION, Tokyo (JP)

(72) Inventors: Shoji Kono, Musashino (JP); Daisuke Ikegami, Musashino (JP); Jun Okamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 94 days.

(21) Appl. No.: 17/593,060

(22) PCT Filed: Mar. 10, 2020

(86) PCT No.: PCT/JP2020/010204
§ 371 (c)(1),
(2) Date: Sep. 8, 2021

(87) PCT Pub. No.: WO2020/189399
PCT Pub. Date: Sep. 24, 2020

(65) Prior Publication Data
US 2022/0201552 A1 Jun. 23, 2022

(30) Foreign Application Priority Data
Mar. 15, 2019 (JP) .............................. JP2019-049087

(51) Int. Cl.
*H04W 28/08* (2023.01)
*H04B 17/373* (2015.01)
(Continued)

(52) U.S. Cl.
CPC ...... *H04W 28/0967* (2020.05); *H04B 17/373* (2015.01); *H04L 41/5019* (2013.01);
(Continued)

(58) Field of Classification Search
None
See application file for complete search history.

(56) References Cited

U.S. PATENT DOCUMENTS

| 6,618,696 B1 * | 9/2003 | Dean ...................... H04L 1/241 |
|---|---|---|
| | | 703/2 |
| 2013/0117420 A1 * | 5/2013 | Han ...................... H04W 40/32 |
| | | 709/220 |
| 2016/0142510 A1 * | 5/2016 | Westphal ................ H04L 67/02 |
| | | 709/219 |

FOREIGN PATENT DOCUMENTS

| JP | 2014-087031 | 5/2014 |
|---|---|---|
| JP | 2016-111675 | 6/2016 |
| JP | 2018-037960 | 3/2018 |

OTHER PUBLICATIONS

Hiromichi Kawano, et al., "Study on Teletraffic Forecasting Method for Macro Analyses and Its Evaluation" Shingakukai (IEICE Transactions on Fundamentals of Electronics, Communications and Computer Sciences) B, vol. J-82-B, No. 6, pp. 1107-1114, 1999.

* cited by examiner

*Primary Examiner* — Angela Nguyen
(74) *Attorney, Agent, or Firm* — IPUSA, PLLC (57) ABSTRACT

A communication band calculation device includes a memory; and a processor configured to execute acquiring user-based traffic information; defining non-overlapping separate section columns having any section width as a state space and sets a user distribution of a traffic amount according to the state space based on the traffic information; generating a transition probability matrix in which a transi- (Continued)

tion probability that a transition from a separate section to another in the state space occurs is set as an element based on the traffic information; obtaining prediction of the user distribution at a desired future time using a product of the user distribution which is a starting point of prediction and the transition probability matrix; and calculating an amount of band facilities required to achieve quality of a communication service at a future point in time based on the user distribution in future.

7 Claims, 4 Drawing Sheets

(51) Int. Cl.
*H04L 41/5019* (2022.01)
*H04L 41/5067* (2022.01)
*H04L 43/0882* (2022.01)
*H04L 43/0894* (2022.01)

(52) U.S. Cl.
CPC ...... *H04L 41/5067* (2013.01); *H04L 43/0882* (2013.01); *H04L 43/0894* (2013.01)

COMMUNICATION BAND CALCULATION DEVICE, COMMUNICATION BAND CALCULATION METHOD, AND MEDIUM

TECHNICAL FIELD

The present invention relates to a communication band calculation device, a communication band calculation method, and a program. More specifically, the present invention relates to a technique for predicting and calculating the amount of band facilities required in a future planning target time in order to provide the quality of a communication service required by a user, with respect to communication facilities of a communication network in which the amount of communication traffic increases (decreases) while fluctuating.

BACKGROUND ART

Hitherto, quality of service (QoS) or quality of experience (QoE) has been determined as the quality of communication services required by users with respect to communication services provided through communication networks, regardless of the form of a fixed line or a mobile object. Communication service providers perform planning, construction, operation, and management of the amount of facilities of various communication resources represented by a communication band of a communication network for the purpose of providing such service quality economically in the future.

In order to achieve the above-described object, knowledge of traffic characteristics is acquired and accumulated by measuring amounts of traffic constantly and analyzing and evaluating traffic characteristics of a communication service which is provided. There have been demands for a technique for predicting the amount of traffic at a future point in time by utilizing the obtained knowledge, achieving the quality of a communication service which is provided on the basis of the amount of traffic, and calculating the amount of facilities of communication resources in exact quantities from the viewpoint of economical efficiency of the communication service.

Techniques related to prediction of an amount of traffic at a future point in time and calculation of an amount of facilities include a large number of prior arts as follows.

Prior art regarding a communication network providing a fixed telephone service is proposed in, for example, NPL 1.

Prior art regarding a communication network that multiplexes and provides various communication services including telephony, Internet access, and video distribution (video on demand/IP multichannel broadcasting) on the basis of a transmission control protocol/Internet protocol (TCP/IP) is proposed in, for example, PTL 1.

Prior art regarding a communication network that provides a secure communication service connected to a corporation base local area network (LAN) located at a remote place mainly to corporation users is proposed in, for example, PTL 2.

Prior art regarding a cellular-type communication network that provides a mobile object communication service is proposed in, for example, PTL 3.

CITATION LIST

Patent Literature

[PTL 1] Japanese Patent Application Publication No. 2014-87031
[PTL 2] Japanese Patent Application Publication No. 2016-111675
[PTL 3] Japanese Patent Application Publication No. 2018-37960

Non Patent Literature

[NPL 1] Hiromichi Kawano, et al., "Study on Teletraffic Forecasting Method for Macro Analyses and Its Evaluation" Shingakukai (IEICE Transactions on Fundamentals of Electronics, Communications and Computer Sciences) B, Vol. J-82-B, No. 6, pp. 1107-1114, 1999

SUMMARY OF THE INVENTION

Technical Problem

Hereinafter, a distribution of a total traffic amount of a data communication service from one or more communication terminals associated with a contracting user will be referred to as a user distribution of a traffic amount. The number of persons of a user group consuming traffic amounts of close numerical values can be ascertained from a user distribution of a traffic amount.

Since a traffic amount transmitted and received by a user who uses a communication service is related to the user's life cycle, social life, and the like, a relatively stable numerical value is obtained when a traffic amount is integrated over a grouped period such as a monthly basis. Further, as described above, a relationship in which life cycles and social lives are relatively close to each other (user attributes) is established in a user group consuming traffic amounts of close numerical values, and thus a relationship in which time-series changes (transitions) in traffic amounts of such a user group are similar to each other, that is, numerical values at a future point in time are close to each other, can be assumed. For this reason, prediction focusing on a transition of a user distribution of a traffic amount can be expected to have a high level of accuracy.

In this manner, it is considered possible to accurately calculate a communication band required to achieve the quality of a communication service by predicting a user distribution of a traffic amount in a future planning target time. However, a user distribution of a traffic amount in the future planning target time is not predicted in any of the above-described Patent Literature or Non Patent Literature.

An object of the present invention is to accurately calculate a communication band required to achieve quality of a communication service by predicting a user distribution of a traffic amount in a future planning target time.

Means for Solving the Problem

A communication band calculation device according to an aspect of the present invention is a communication band calculation device that calculates a required band of a communication facility providing a communication service and includes an information acquisition unit that acquires user-based traffic information, a traffic amount user distribution setting unit that defines non-overlapping separate section columns, which are obtained by dividing an available number of a traffic amount by any section width, as a state space and sets a user distribution of a traffic amount representing the number of users for each separate section at the time of dividing a traffic amount in accordance with the state space on the basis of the user-based traffic information, a transition probability matrix generation unit that generates a transition probability matrix in which a transition probability that a transition from a certain separate section to another separate section in the state space will occur is set as an element on the basis of the user-based traffic information, a prediction computation unit that obtains prediction of the user distribution of the traffic amount at a desired future point in time using a product of the user distribution of the traffic amount which is a starting point of prediction and the transition probability matrix, and a communication band calculation unit that calculates an amount of band facilities required to achieve quality of a communication service at a future point in time on the basis of the user distribution of the traffic amount at the future point in time which is obtained by the prediction computation unit.

In addition, a communication band calculation method according to an aspect of the present invention is a communication band calculation method executed by a communication band calculation device that calculates a required band of a communication facility providing a communication service and includes an information acquisition step of acquiring user-based traffic information, a traffic amount user distribution setting step of defining non-overlapping separate section columns, which are obtained by dividing an available number of a traffic amount by any section width, as a state space and setting a user distribution of a traffic amount representing the number of users for each separate section at the time of dividing a traffic amount in accordance with the state space on the basis of the user-based traffic information, a transition probability matrix generation step of generating a transition probability matrix in which a transition probability that a transition from a certain separate section to another separate section in the state space will occur is set as an element, on the basis of the user-based traffic information, a prediction computation step of obtaining prediction of the user distribution of the traffic amount at a desired future point in time using a product of the user distribution of the traffic amount which is a starting point of prediction and the transition probability matrix, and a communication band calculation step of calculating an amount of band facilities required to achieve quality of a communication service at a future point in time, on the basis of the obtained user distribution of the traffic amount at the future point in time which is obtained in the prediction computation step.

In addition, a program according to an aspect of the present invention causes a computer to function as the above-described communication band calculation device.

Effects of the Invention

According to the present invention, it is possible to accurately calculate a communication band required to achieve quality of a communication service by predicting a user distribution of a traffic amount in a future planning target time.

DESCRIPTION OF EMBODIMENTS

In an embodiment of the present invention, a communication band calculation device for accurately calculating a communication band required to achieve quality of a communication service by predicting a user distribution of a traffic amount in a future planning target time will be described.

In the present embodiment, a situation in which the amount of band facilities that will be required in the future is continuously calculated and evaluated in accordance with the management and operation of a communication network facility which are performed by a communication common carrier is assumed. A band required to secure quality of a communication service at a desired future point in time is calculated at a cycle of a fixed period of time, the degree of future deadlock and tightness of the present band facility is estimated, and construction work such as installation of more facilities required due to a difference therebetween is planned and executed.

Hereinafter, an embodiment of the present invention will be described with reference to the drawings.

<Configuration of Communication Band Calculation Device>

Figure 1:
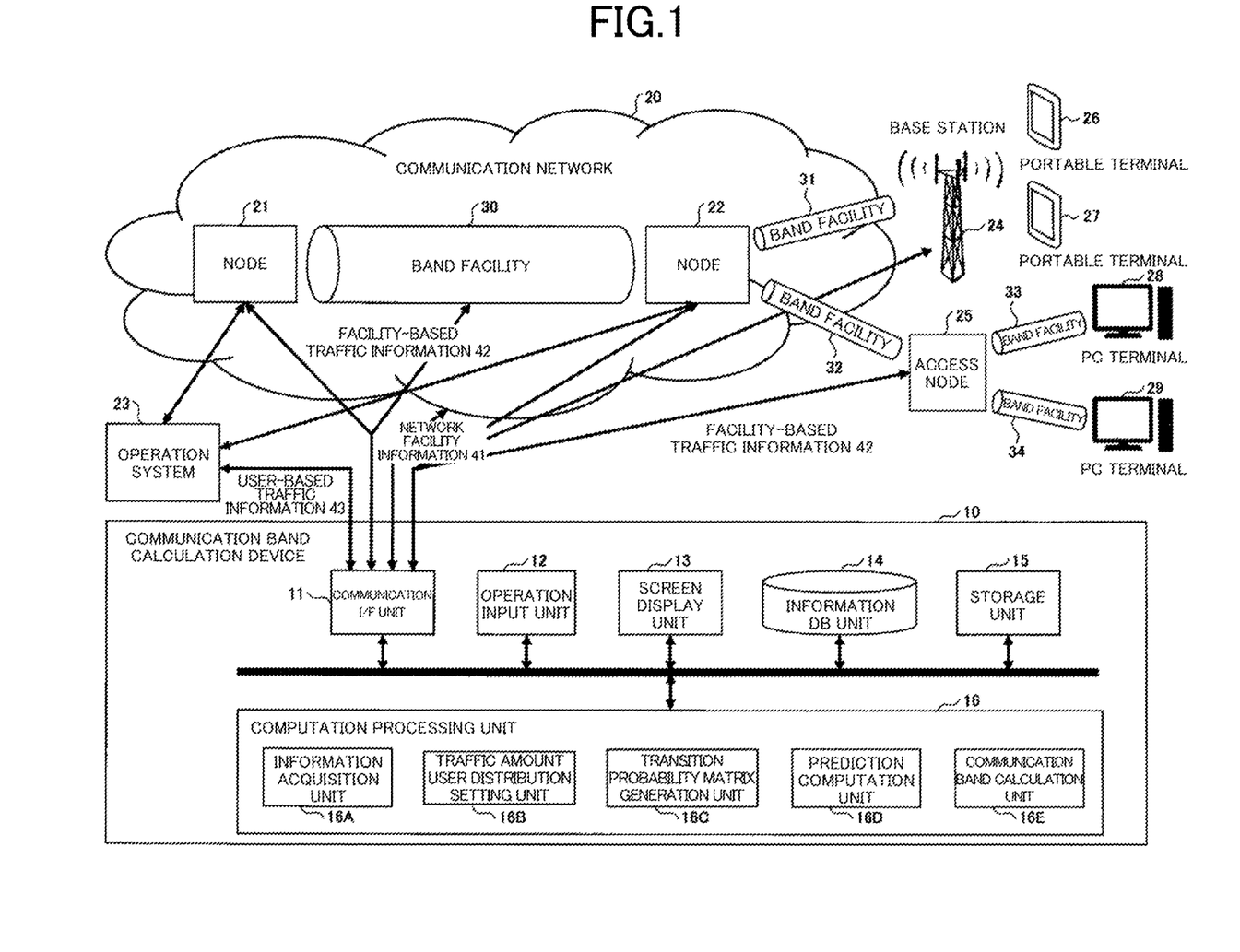
FIG. 1 is an overall block diagram illustrating a configuration of a communication band calculation device according to the present embodiment.

FIG. 1 is an overall block diagram illustrating a configuration of a communication band calculation device 10 according to an embodiment of the present invention. In the present embodiment, a communication network that provides a data communication service will be described as an example.

As illustrated in FIG. 1, a communication network 20 is a facility for providing data communication services to portable terminals 26 and 27 and PC terminals 28 and 29. Data information transmitted and received by the portable terminals 26 and 27 and the PC terminals 28 and 29 is converted into an electric signal in a base station 24 and an access node 25, transmitted to a node 22 through band facilities 31 and 32, and then transmitted to a desired transmission and reception destination in a communication network, and thus a data communication service is achieved.

The communication band calculation device 10 is constituted by an information processing device such as a server device using a computer.

The communication band calculation device 10 appropriately acquires network facility information 41 from the communication network 20 or an operation system 23. The network facility information 41 includes node configuration information, topology information, line band information, facility amount information, and the like related to the communication network 20.

Facility-based traffic information 42 related to band facilities 30, 31, 32, 33, and 34 to be operated, managed, and designed is measured in nodes 21 and 22 or the base station 24 and the access node 25 at fixed time intervals. In the operation system 23, the facility-based traffic information 42 is collected periodically and accumulated over a long period of time. The communication band calculation device 10 appropriately acquires the facility-based traffic information 42 from the operation system 23.

Further, for a user who contracts a data communication service provided by a communication common carrier, past history information of a traffic amount for each fixed period such as a monthly basis is set to be user-based traffic information 43.

The communication band calculation device 10 appropriately acquires the user-based traffic information 43 from the operation system 23.

The communication band calculation device 10 has a function of accurately calculating a communication band required to achieve the quality of a communication service by predicting a user distribution of a traffic amount in the future planning target time on the basis of the acquired information.

Next, an internal configuration of the communication band calculation device 10 according to the present embodiment will be described in detail.

The communication band calculation device 10 is provided with a communication interface unit 11 (hereinafter referred to as a communication I/F unit 11), an operation input unit 12, a screen display unit 13, an information database unit 14 (hereinafter referred to as an information DB unit 14), a storage unit 15, and a computation processing unit 16 as main functional units, and these units are connected to each other through an internal communication bus and have functions of transmitting and receiving information to and from each other.

The communication I/F unit 11 is constituted by a dedicated data communication circuit and has a function of performing communication with an external device such as the operation system 23.

The operation input unit 12 is constituted by an operation input device such as a keyboard or a mouse and has a function of detecting an operator's input operation and outputting the detected input operation to the computation processing unit 16.

The screen display unit 13 is a screen display device such as a display and has a function of displaying various information, such as an operation menu and calculation results, on a screen in response to an instruction from the computation processing unit 16.

The information DB unit 14 is constituted by a storage device such as a hard disk and has a function of storing and accumulating various processing information used for required band calculation processing performed in the computation processing unit 16.

The storage unit 15 is constituted by a storage device such as a hard disk or a memory and has a function of storing various processing information and programs used for required band calculation processing performed in the computation processing unit 16.

The computation processing unit 16 includes a microprocessor, such as a central processing unit (CPU), and peripheral circuits thereof. The computation processing unit 16 reads a program stored in the storage unit 15 and appropriately acquires the network facility information 41, the facility-based traffic information 42, the user-based traffic information 43, and the like, which are required for processing, from the information DB 14 or the operation input unit 12. In addition, the computation processing unit 16 predicts a user distribution of a traffic amount in the future planning target time. Thus, the computation processing unit 16 has a function of accurately calculating a communication band required to achieve quality of a communication service and a function of outputting the calculation results to the outside such as the information DB unit 14.

The network facility information 41 includes speed information $B\_\{j\}$ of any interface j of a communication facility operated in the communication network 20 including the band facilities 30, 31, 32, 33, and 34, the nodes 21 and 22, the base station 24, and the access node 25. In addition, the network facility information 41 includes information on a connection configuration relationship between interfaces of communication facilities operated in the communication network 20 including the band facilities 30, 31, 32, 33, and 34, the nodes 21 and 22, the base station 24, and the access node 25. Further, it is assumed that the network facility information 41 also includes information on a connection configuration relationship between interfaces of communication facilities operated in the communication network 20 in construction plans scheduled from the past to the future as well as construction plans scheduled in the present. For the sake of simplicity, the network facility information 41 will be referred to as $\{BD\}$.

The facility-based traffic information 42 includes time-series data of a measured traffic amount which is continuously measured over a long period of time at measurement cycles defined in advance, with respect to the amount of traffic entering and exiting any arbitrary interface j of a communication facility operated in the communication network 20. A measured traffic amount in a measurement period t of the interface j is defined as $Y\_\{j\}$ (t), and a set of the time-series data thereof is defined as $\{Y\_\{j\}(t), t \in T\}$. This will be referred to as time-series data of a measured traffic amount, or simply referred to as a measured traffic amount. In principle, the measurement of a measured traffic amount is continuously performed on all communication facilities and interfaces thereof. For the sake of simplicity, the facility-based traffic information 42 will be referred to as $\{DT\}$.

As described above, the user-based traffic information 43 includes past history information of a traffic amount integrated on a monthly basis for any user $u \in U$ who contracts a data communication service of a communication common carrier. For the sake of simplicity, the user-based traffic information 43 will be referred to as $\{UT\}$.

Next, a configuration of the computation processing unit 16 will be described in detail with reference to FIGS. 2 to 4.

Figure 2:
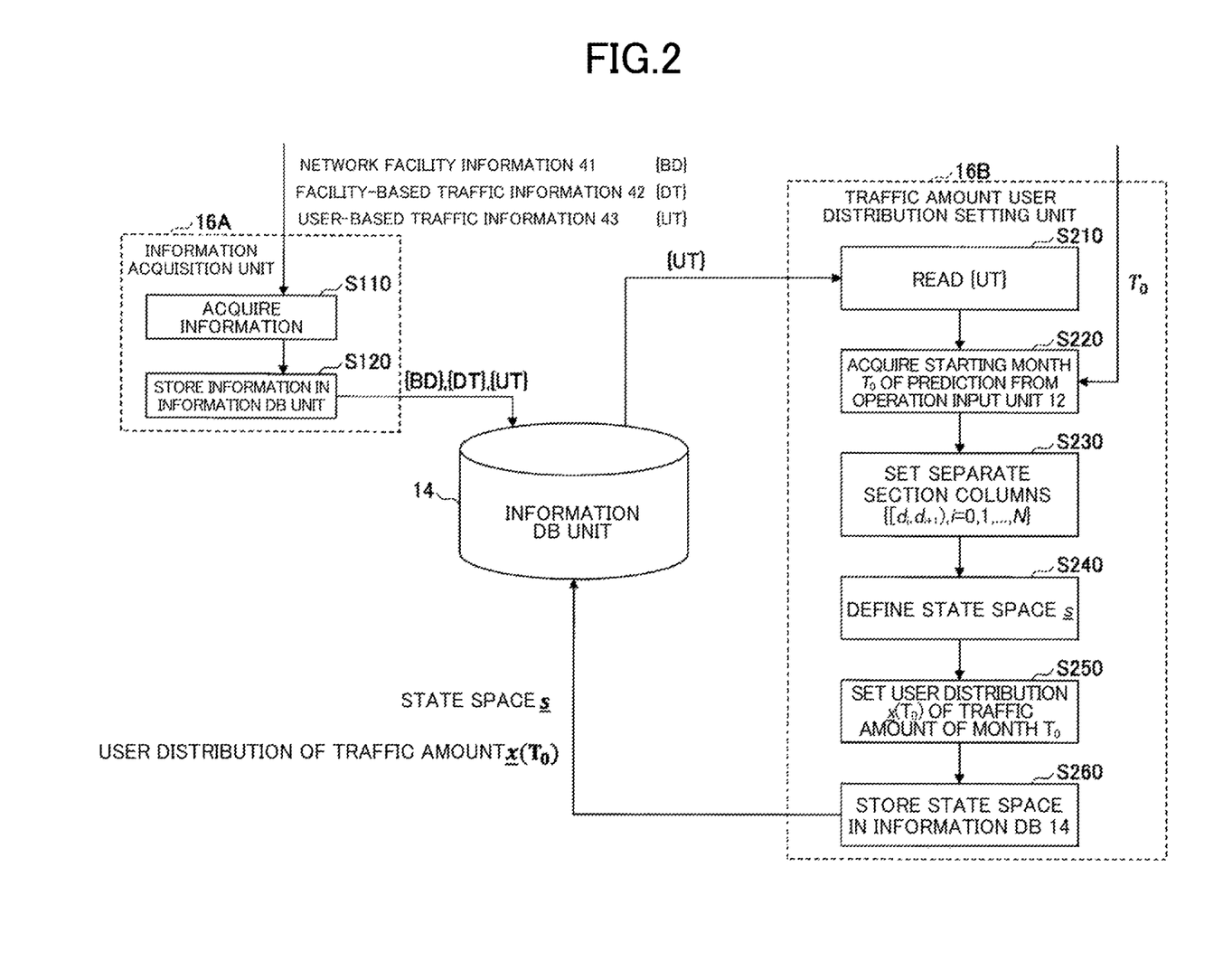
FIG. 2 is a flow diagram (Part 1) illustrating processing of a computation processing unit 16.
Figure 3:
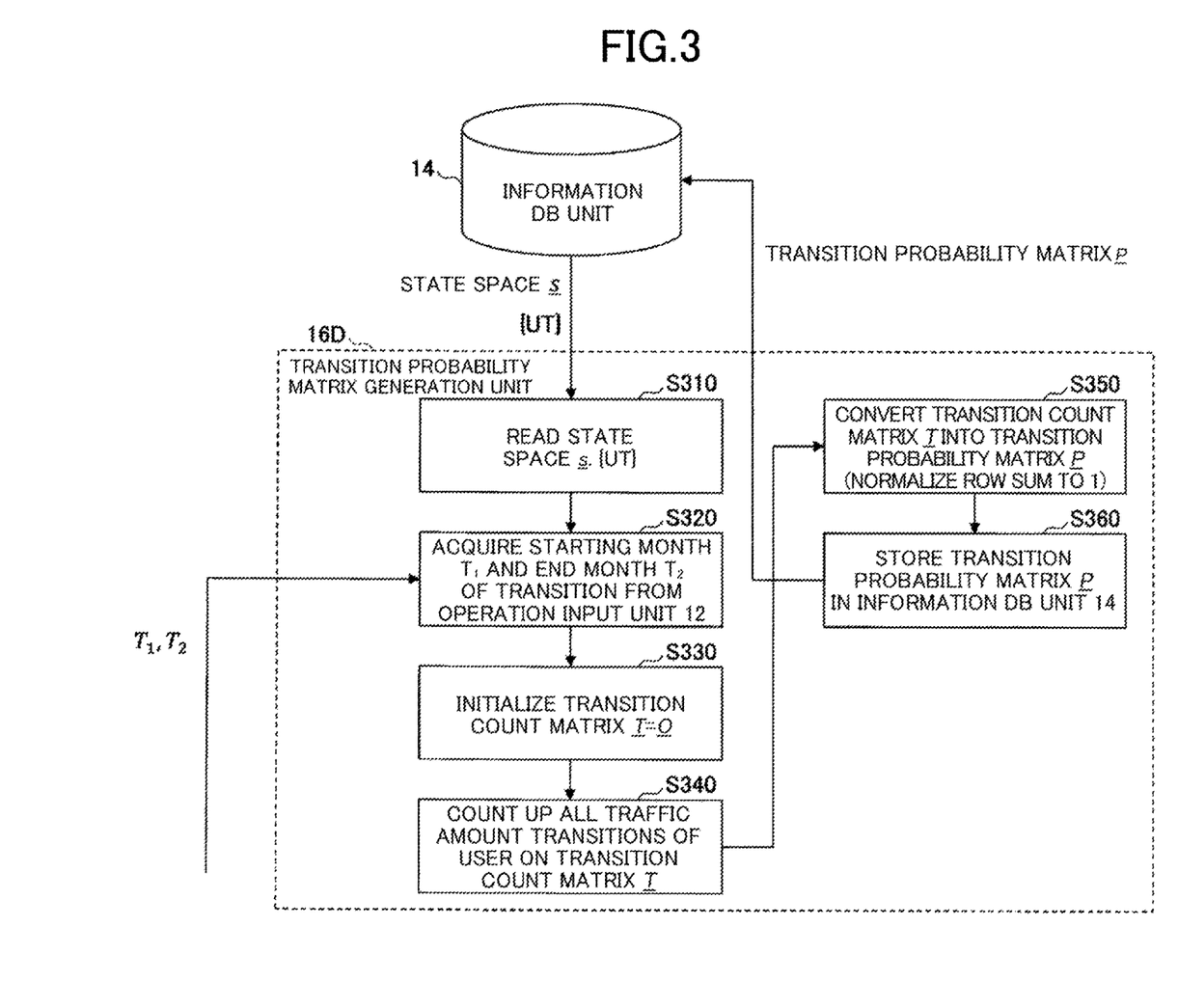
FIG. 3 is a flow diagram (Part 2) illustrating processing of the computation processing unit 16.
Figure 4:
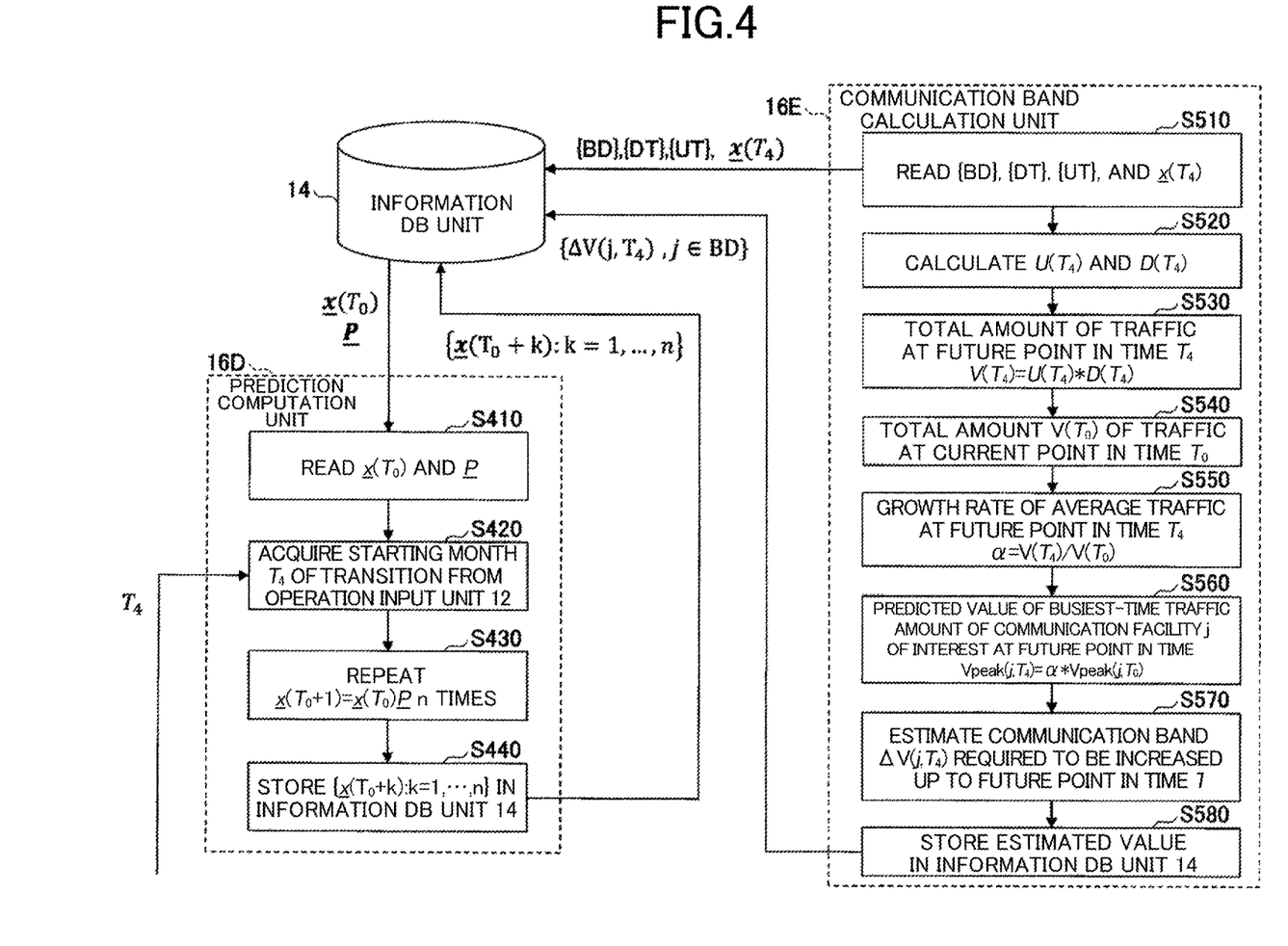
FIG. 4 is a flow diagram (Part 3) illustrating processing of the computation processing unit 16.

FIGS. 2 to 4 are flow diagrams illustrating communication band calculation processing performed in the computation processing unit 16. The computation processing unit 16 has a function of realizing an information acquisition unit 16A, a traffic amount user distribution setting unit 16B, a transition probability matrix generation unit 16C, a prediction computation unit 16D, and a communication band calculation unit 16E as main processing units constituting the computation processing unit 16.

<Setting of User Distribution of Traffic Amount>

The information acquisition unit 16A acquires the network facility information 41, the facility-based traffic information 42, and the user-based traffic information 43, which are information required for communication band calculation, from the operation system 23 with respect to a service providing area of a communication network to be planned (FIG. 2, step S110), and stores the various information in the information DB unit 14 (FIG. 2, step S120).

The traffic amount user distribution setting unit 16B acquires the user-based traffic information 43 from the information DB unit 14 as an input (FIG. 2, step S210).

The traffic amount user distribution setting unit 16B acquires a month $T_0$ which is a starting point of prediction from the operation input unit 12 (FIG. 2, step S220).

The traffic amount user distribution setting unit 16B sets non-overlapping separate section columns $\{[d_i, d_{i+1}), i=0, 1, \ldots, N\}$ corresponding to a non-negative real number space $[0, +\infty)$ (FIG. 2, step S230).

Hereinafter, the setting of the separate section columns $\{[d_i, d_{i+1}), i=0, 1, \ldots, N\}$ will be described.

Here, the non-negative real number space $[0, +\infty)$ which is a value range of possible numbers of a traffic amount of a user is divided into non-overlapping separate section columns $\{[d_i, d_{i+1}), i=0, 1, \ldots, N\}$, and the section $[d_i, d_{i+1})$ is made to correspond to one of states of a user distribution of the traffic amount. Here, $d_0=0$, and $d_{N+1}=+\infty$. A method of determining the separate section columns $\{[d_i, d_{i+1}), i=0, 1, \ldots, N\}$ may be division of a traffic amount by any section width. For example, the separate section columns $\{[d_i, d_{i+i}), i=0, 1, \ldots, N\}$ may be divided by a section width 1 (GB).

The traffic amount user distribution setting unit 16B defines this as a state space $\underline{s}$ (FIG. 2, step S240). The separate section $[d_i, d_{i+1})$ corresponds to each of states of the state space $\underline{s}$.

The traffic amount user distribution setting unit 16B sets a user distribution of a traffic amount representing the number of users for each separate section at the time of dividing the traffic amount in accordance with the state space, on the basis of the user-based traffic information 43. Specifically, a traffic amount of a month $T_0$ of each user is read for each of users to be predicted, and a value obtained by incrementing a numerical value of a state of a state space corresponding to a separate section $[d_i, d_{i+1})$ including the traffic amount by one for each of the users is set as a user distribution $\underline{x}(T_0)$ of the traffic amount of the month $T_0$ (FIG. 2, step S250).

For example, in a case where the separate section columns $\{[d_i, d_{i+1}), i=0, 1, \ldots, N\}$ are divided by a section width 1 (GB), the number of users in which the traffic amount of the month $T_0$ falls within a separate section $[d_0, d_1)$ of 0 GB to 1 GB, the number of users in which the traffic amount of the month $T_0$ falls within a separate section $[d_1, d_2)$ of 1 GB to 2 GB, . . . , and the number of users in which the traffic amount of the month $T_0$ falls within a separate section $[d_N, d_{N+1})$ of N GB to N+1 GB are set as the user distribution $\underline{x}(T_0)$ of the traffic amount of the month $T_0$.

The traffic amount user distribution setting unit 16B stores the user distribution $\underline{x}(T_0)$ of the traffic amount of the month $T_0$ and the state space $\underline{s}$ in the information DB unit 14 (FIG. 2, step S260).

<Generation of Transition Probability Matrix>

The transition probability matrix generation unit 16C acquires the state space $\underline{s}$ and the user-based traffic information 43 from the information DB unit 14 as inputs (FIG. 3, step S310).

The transition probability matrix generation unit 16C acquires a month $T_1$ which is a starting point of a transition of a traffic amount and a month $T_2$ which is an end point of the transition from the operation input unit 12 (FIG. 2, step S320).

The transition probability matrix generation unit 16C calculates a transition count matrix $\underline{T}$ (FIG. 3, step S330 to step S340).

Hereinafter, the transition count matrix $\underline{T}$ will be described in detail.

The transition count matrix $\sqrt{T}$ is a secondary square matrix having the same state space as the state space $\underline{s}$. That is, the transition count matrix $\underline{T}$ is a square matrix having N+1 rows and N+1 columns which are the number of states of the state space $\underline{s}$. Each row in the transition count matrix $\underline{T}$ corresponds to one of the states of the starting month $T_1$, and each column in the transition count matrix $\underline{T}$ corresponds to one of the states of the end month $T_2$. As initialization, numerical values in the transition count matrix $\underline{T}$ are set to 0 (FIG. 3, step S330).

The transition probability matrix generation unit 16C sets a state $s_1$ of the state space $\underline{s}$ which corresponds to the traffic amount of the starting month $T_1$, and similarly sets a state $s_2$ of the state space $\underline{s}$ which corresponds to the traffic amount of the end month $T_2$ for each of the users to be predicted, by using the user-based traffic information 43. In this case, an element $(s_1, s_2)$ of the transition count matrix $\underline{T}$ is counted up by one. Transition count matrices $\underline{T}$ of the starting month $T_1$ and the end month $T_2$ are obtained by performing the above-described counting-up for all of the users to be predicted (FIG. 3, step S340).

For example, in a case where the separate section columns $\{[d_i, d_{i+1}), i=0, 1, \ldots, N\}$ are divided by a section width 1 (GB), and a user falling within a separate section $[d_0, d_1)$ of 0 GB to 1 GB in the starting month $T_1$ falls within a separate section $[d_1, d_2)$ of 1 GB to 2 GB in the end month $T_2$, an element in each of a first row and a second column of the transition count matrix $\underline{T}$ is counted up by one. On the other hand, in a case where a user falling within a separate section $[d_1, d_2)$ of 1 GB to 2 GB in the starting month $T_1$ falls within a separate section $[d_0, d_1)$ of 0 GB to 1 GB in the end month $T_2$, each element in a second row and a first column of the transition count matrix $\underline{T}$ is counted up by one. The above-described counting-up is performed for all of the users to be predicted, thereby obtaining a transition count matrix $\underline{T}$ in which the number of times a transition from (a separate section including a traffic amount consumed in the starting month $T_1$) to (a separate section including a traffic amount consumed in the end month $T_2$) has occurred from the starting month $T_1$ to the end month $T_2$ for each of the users to be predicted is set as an element of the matrix.

The transition probability matrix generation unit 16C calculates a transition probability matrix $\underline{P}$ from the transition count matrix $\underline{T}$ (FIG. 3, step S350).

Hereinafter, the transition probability matrix $\underline{P}$ will be described in detail.

The transition probability matrix $\underline{P}$, which is a secondary square matrix having the same state space as the state space $\underline{s}$, is a probability matrix in which a probability that a transition from the state $s_1$ of the state space $\underline{s}$ corresponding to the traffic amount of the starting month $T_1$ to the state $s_2$ of the state space s corresponding to the traffic amount of the end month $T_2$ will occur for a traffic amount of a user to be predicted is equal to an element $(s_1, s_2)$ of the transition probability matrix $\underline{P}$.

The transition probability matrix $\underline{P}$ is obtained by performing normalization for setting a row sum of each row in the transition count matrix $\underline{T}$ to 1 (FIG. 3, step S350).

The transition probability matrix generation unit 16C stores the transition probability matrix $\underline{P}$ in the information DB unit 14 (FIG. 3, step S360).

<Prediction of User Distribution of Traffic Amount at Future Point in Time>

Up to this point, the starting month $T_1$ and the end month $T_2$ of a transition have been generally used, but hereinafter, a difference between a starting month and an end month of a transition will be set to be one month for the sake of simplicity.

The following transition probability matrix $\underline{P}$ may correspond to a transition probability after one month of a traffic amount of a user or may be a transition probability after one month of a traffic amount of a user in the sense that a transition over several months is averaged.

A condition for improving the accuracy of prediction in the present invention is that the transition probability matrix P not depend on a starting month of a transition. Thus, a starting month will be omitted below.

The prediction computation unit 16D acquires a user distribution $\underline{x}(T_0)$ of a traffic amount which is a starting point of prediction and the transition probability matrix $\underline{P}$ from the information DB unit 14 as inputs (FIG. 4, step S410).

The prediction computation unit 16D acquires a future point in time $T_4$, which is a prediction destination, from the operation input unit 12 (FIG. 4, step S420).

A user distribution $\underline{x}(T_0+1)$ of a traffic amount to be predicted one month ahead of a starting point $T_0$ of prediction is obtained through a product operation of the user distribution $\underline{x}(T_0)$ of the traffic amount which is a starting point of the prediction and the transition probability matrix $\underline{P}$ as follows.

$$\underline{x}(T_0+1)=\underline{x}(T_0)\underline{P}$$

Assuming a desired future point in time $T_4=T_0+n$, columns $\{\underline{x}(T_0+k):k=1,\ldots,n\}$ of user distributions of the traffic amounts up to a desired future point in time $T_4$ are obtained by repeating the above-described product operation n times (FIG. 4, step S430).

The prediction computation unit 16D stores columns $\{\underline{x}(T_0+k):k=1,\ldots,n\}$ of user distributions of traffic amounts up to n months ahead in the information DB unit 14 (FIG. 4, step S440).

<Calculation of Necessary Communication Band>

A communication band calculation unit 16E acquires a user distribution $\underline{x}(T_4)$ of a traffic amount predicted at a desired future point in time $T_4$, the network facility information 41, the facility-based traffic information 42, and the user-based traffic information 43 from the information DB unit 14 as inputs (FIG. 4, step S510).

The communication band calculation unit 16E calculates a predicted value U ($T_4$) of a total number of users who use a communication service and a predicted value D ($T_4$) of an average user traffic amount from the user distribution $\underline{x}(T_4)$ of the traffic amount (FIG. 4, step S520).

Here, a total number of users included in a user distribution $\underline{x}(t)$ of a traffic amount is defined as U(t). When the number of users included in $[d_i, d_{i+1})$ among the separate section columns $\{[d_i, d_{i+1})\ i=0, 1, \ldots, N\}$ is set to be $\underline{x}([d_i, d_{i+1})\ T_4)$ with respect to the user distribution $\underline{x}(T_4)$ of the traffic amount at the future point in time $T_4$ to be predicted, a total number of users $U(T_4)$ included in the user distribution $\underline{x}(T_4)$ of the traffic amount is obtained.

$$U(T_4) = \sum_{i=0}^{N} \underline{x}([d_i, d_{i+1}), T_4) \qquad \text{[Math. 1]}$$

Meanwhile, it is also possible to perform a process of correcting the number of users on the assumption that the number of users who use a service to be predicted will change. Specifically, a past history $\{U(t):t\le T_0\}$ of the number of users is obtained from a past history $\{\underline{x}(t):t\le T_0\}$ of a user distribution of a traffic amount. Linear regression may be applied using this, and a process of correcting the number of users may be added to columns $\{\underline{x}(T_0+k):k=1,\ldots,n\}$ of user distributions of traffic amounts.

In addition, an average user traffic amount of a user distribution $\underline{x}(t)$ of a traffic amount is defined as D(t).

An average user traffic amount $D(T_4)$ at the future point in time $T_4$ to be predicted is obtained as follows. However, this is an approximate value.

$$D(T_4) = \sum_{i=0}^{N} \frac{d_{i+1}-d_i}{2} * \underline{x}([d_i, d_{i+1}), T_4) \qquad \text{[Math. 2]}$$

Assuming that the sum of traffic amounts to be transmitted by the communication common carrier at the future point in time $T_4$ is $V(T_4)$, the communication band calculation unit 16E can calculate $V(T_4)$ using a product of the total number of users U ($T_4$) and the average user traffic amount D ($T_4$) as follows (FIG. 4, step S530).

$$V(T_4)=U(T_4)*D(T_4)$$

Further, the communication band calculation unit 16E can calculate the current total traffic amount $V(T_0)$ of the communication common carrier at the starting point $T_0$ of prediction from the facility-based traffic information 42 (FIG. 4, step S540).

The communication band calculation unit 16E can determine a growth rate $\alpha=V(T_4)/V(T_0)$ at a total traffic amount level at the future point in time $T_4$ on the basis of a ratio of the total traffic amount $V(T_4)$ at the future point in time $T_4$ to the current total traffic amount $V(T_0)$ (FIG. 4, step S550).

Further, the communication band calculation unit 16E extracts facility information in units of facilities from the network facility information 41. In addition, a busiest-time traffic amount $V_{peak}(j, T_0)$ being currently transmitted is extracted from the facility-based traffic information 42 with respect to an interface j of a communication facility of interest and is multiplied by an average growth rate $\alpha$ of traffic up to the future point in time $T_4$, and thus a predicted value of a busiest-time traffic amount at the future point in time $T_4$ can be estimated as $V_{peak}(j, T_4)=\alpha*V_{peak}(j, T_4)$ (FIG. 4, step S560).

The communication band calculation unit 16E can estimate the level of service quality realized at the future point in time $T_4$ by comparing the predicted value $V_{peak}(j, T_4)$ of the busiest-time traffic amount at the future point in time $T_4$ with the current transmission capacity (interface speed) of the facility with respect to the interface j of the communication facility. In a case where the estimated level of service quality does not satisfy required service quality, transmission capacity is increased until satisfactory service quality is obtained, and thus it is possible to estimate a communication band $\Delta V(j, T_4)$ required to be increased up to the future point in time $T_4$ and to calculate the amount of band facilities required for the estimation (FIG. 4, step S570).

For the estimation, network simulation or the like may be used, or results of performance verification and load experiment using equivalent facilities or other theories and methods may be used.

The communication band calculation unit 16E stores an estimated value $\{\Delta V(j, T_4), j \in BD\}$ of a communication band required to be increased up to the future point in time $T_4$ with respect to an interface j of any communication facility included in a set BD of all communication facilities in the information DB unit 14 as an output (FIG. 4, step S580).

The communication band calculation device according to the embodiment of the present invention can predict a communication band required to achieve quality of a communication service with respect to traffic of a communication common carrier of a mobile object system or a fixed system or an Internet service provider by using a user distribution of a traffic amount as described above.

<Supplement>

The communication band calculation device according to the embodiment of the present invention has been described using the functional block diagrams for convenience of description, but the communication band calculation device according to the embodiment of the present invention may be realized by hardware, software, or a combination thereof. In addition, functional units may be used in combination as necessary. In addition, the method according to the embodiment of the present invention may be performed in an order different from the order described in the embodiment.

Although a technique for accurately calculating a communication band required to achieve quality of a communication service by predicting a user distribution of a traffic amount in a future planning target time has been described, the present invention is not limited to the above-described embodiment and can be changed and applied in various ways within the scope of the claims.

REFERENCE SIGNS LIST

10 Communication band calculation device
11 Communication I/F unit
12 Operation input unit
13 Screen display unit
14 Information DB unit
15 Storage unit
16 Computation processing unit
16A Information acquisition unit
16B Traffic amount user distribution setting unit
16C Transition probability matrix generation unit
16D Prediction computation unit
16E Communication band calculation unit
20 Communication network
21, 22 Node
23 Operation system
24 Base station
25 Access node
26, 27 Portable terminal
28, 29 PC terminal
30, 31, 32, 33, 34 Band facility
41 Network facility information
42 Facility-based traffic information
43 User-based traffic information

The invention claimed is:

1. A communication band calculation device that calculates a required band of a communication facility providing a communication service, the communication band calculation device comprising:
a memory; and
a processor configured to execute
acquiring user-based traffic information;
defining non-overlapping separate section columns which are obtained by dividing an available number of a traffic amount by any section width as a state space and setting a user distribution of a traffic amount representing the number of users for each separate section at the time of dividing a traffic amount in accordance with the state space on the basis of the user-based traffic information;
generating a transition probability matrix in which a transition probability that a transition from a certain separate section to another separate section in the state space will occur is set as an element on the basis of the user-based traffic information;
obtaining prediction of the user distribution of the traffic amount at a desired future point in time using a product of the user distribution of the traffic amount which is a starting point of prediction and the transition probability matrix; and
calculating an amount of band facilities required to achieve quality of a communication service at a future point in time on the basis of the user distribution of the traffic amount at the future point in time which is obtained by the obtaining.

2. The communication band calculation device according to claim 1, wherein the generating generates a secondary transition count matrix in which numbers of times a transition from a separate section including a traffic amount consumed at a point in time which is a starting point to a separate section including a traffic amount consumed at a point in time which is an end point has occurred are set as elements of the matrix, and generates the transition probability matrix by normalizing the transition count matrix.

3. The communication band calculation device according to claim 1, wherein the acquiring further acquires facility-based traffic information, and the calculating obtains a total number of users and an average user traffic amount from the user distribution of the traffic amount at the future point in time, calculates a total traffic amount at the future point in time using a product of the total number of users and the average user traffic amount, obtains a total traffic amount at a starting point of prediction on the basis of the facility-based traffic information, calculates a growth rate of the total traffic amount at the future point in time, and calculates an estimated value of a communication band required to be increased up to the future point in time with respect to an interface of any communication facility on the basis of the facility-based traffic information.

4. A communication band calculation method executed by a communication band calculation device that includes a memory and a processor to calculate a required band of a communication facility providing a communication service, the communication band calculation method comprising:
acquiring user-based traffic information;
defining non-overlapping separate section columns which are obtained by dividing an available number of a traffic amount by any section width as a state space and setting a user distribution of a traffic amount representing the number of users for each separate section at the time of dividing a traffic amount in accordance with the state space on the basis of the user-based traffic information;
generating a transition probability matrix in which a transition probability that a transition from a certain separate section to another separate section in the state space will occur is set as an element, on the basis of the user-based traffic information;
obtaining prediction of the user distribution of the traffic amount at a desired future point in time using a product of the user distribution of the traffic amount which is a starting point of prediction and the transition probability matrix; and
calculating an amount of band facilities required to achieve quality of a communication service at a future point in time, on the basis of the user distribution of the traffic amount at the future point in time which is obtained in the obtaining.

5. The communication band calculation method according to claim 4, wherein the generating includes generating a secondary transition count matrix in which a number of times a transition from a certain separate section in the state space to another separate section occurs from a point in time which is a starting point to a point in time which is an end time is set as an element, and generating the transition probability matrix by normalizing the transition count matrix.

6. The communication band calculation method according to claim 4, wherein the acquiring includes further acquiring facility-based traffic information, and the calculating includes obtaining a total number of users and an average user traffic amount from the user distribution of the traffic amount at the future point in time, calculating a total traffic amount at the future point in time using a product of the total number of users and the average user traffic amount, obtaining a total traffic amount at a starting point of prediction on the basis of the facility-based traffic information, calculating a growth rate of the total traffic amount at the future point in time, and calculating an estimated value of a communication band required to be increased up to the future point in time with respect to an interface of any communication facility on the basis of the facility-based traffic information.

7. A non-transitory computer-readable recording medium having computer-readable instructions stored thereon, which when executed, cause a computer to function as the communication band calculation device according to claim 1.

\* \* \* \* \*